Feb. 9, 1954 R. G. FERRIS 2,668,381
LATCH MECHANISM FOR GATES
Filed Sept. 12, 1951 2 Sheets-Sheet 1
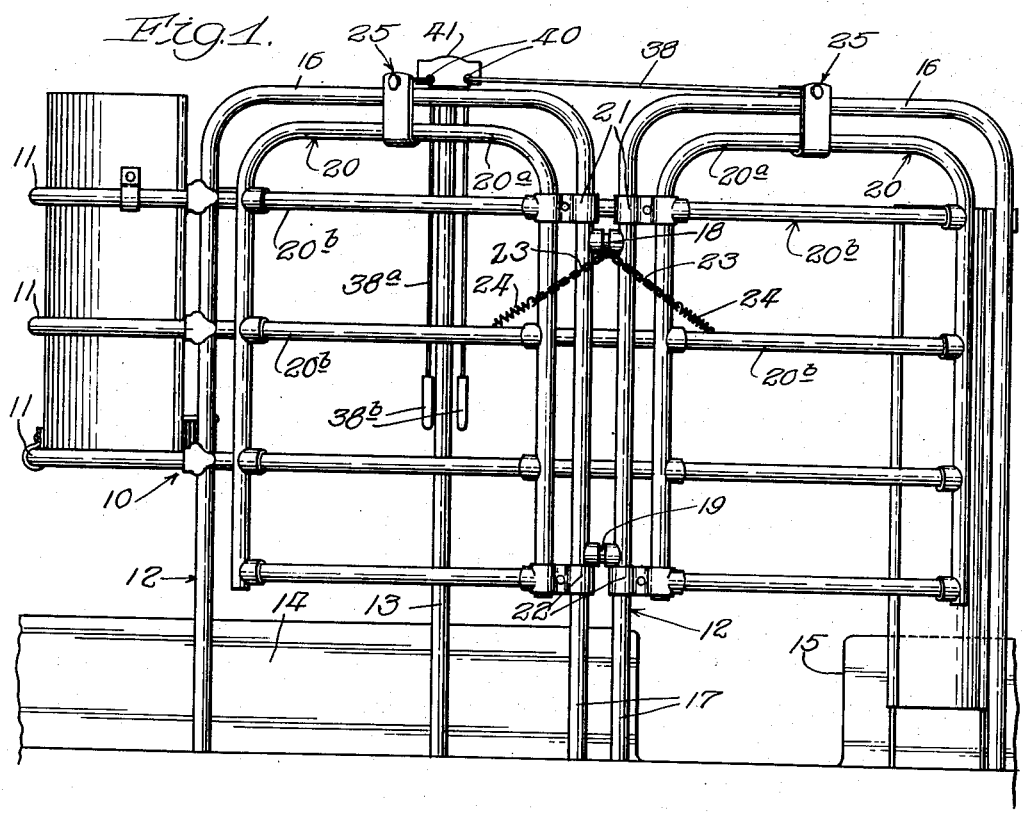
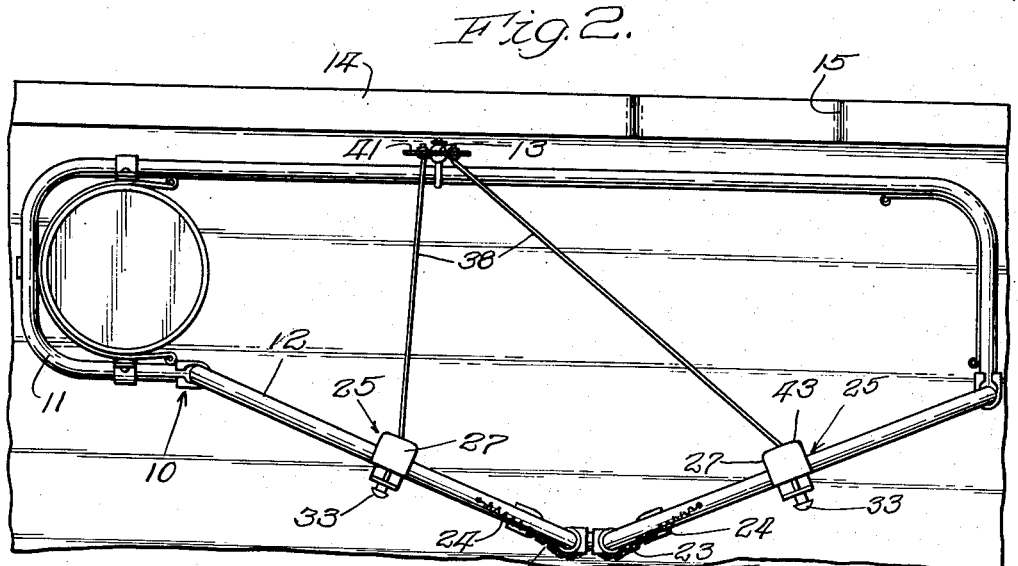
Inventor:
Robert G. Ferris
By Schroeder, Merriam,
Hofgren & Brady, Attys.

Feb. 9, 1954   R. G. FERRIS   2,668,381
LATCH MECHANISM FOR GATES
Filed Sept. 12, 1951   2 Sheets-Sheet 2
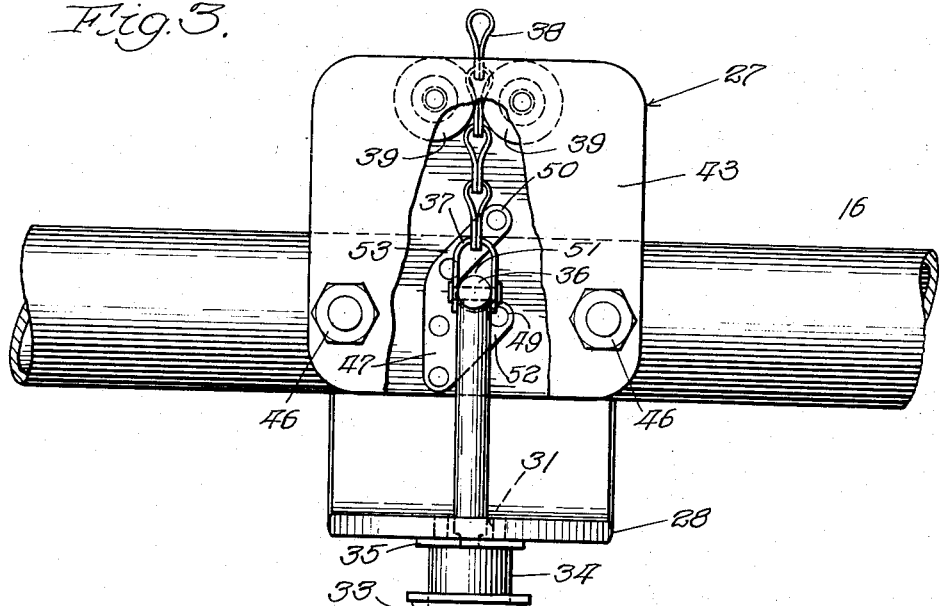
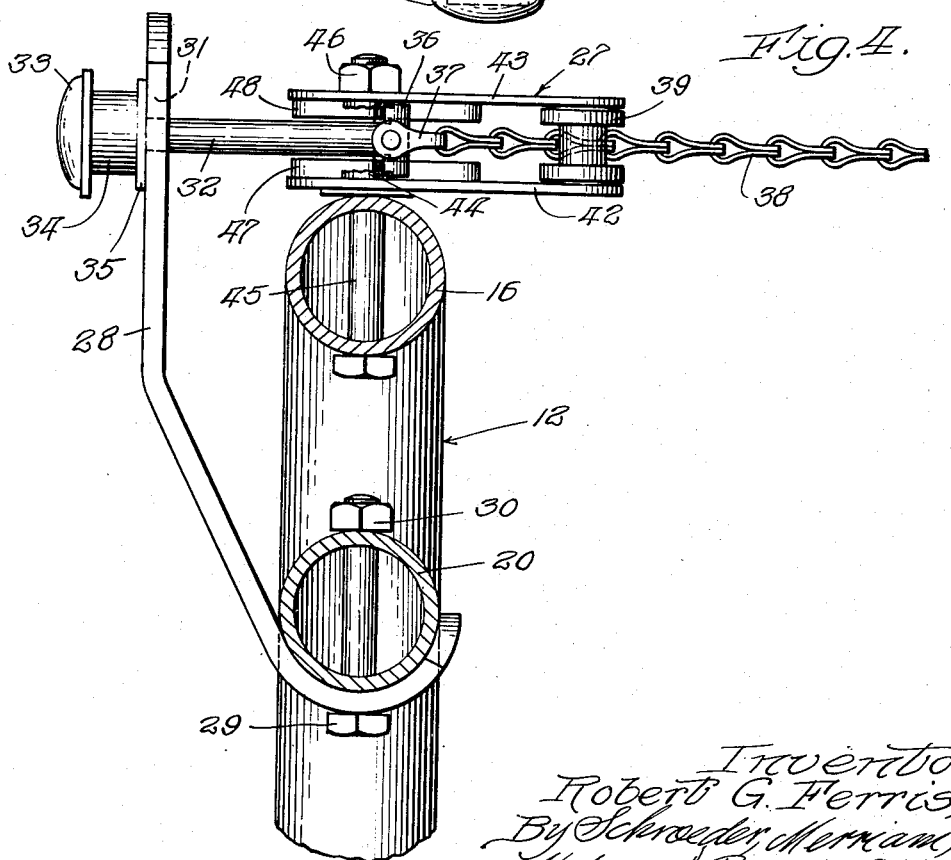
Inventor:
Robert G. Ferris,
By Schroeder, Merriam,
Hofgren & Brady, Attys.

Patented Feb. 9, 1954

2,668,381

UNITED STATES PATENT OFFICE 2,668,381

LATCH MECHANISM FOR GATES

Robert G. Ferris, Harvard, Ill., assignor to Starline Inc., a corporation of Illinois Application September 12, 1951, Serial No. 246,285

13 Claims. (Cl. 39—28)

1

This invention relates to an improved latch assembly for a milking parlor stall or any other construction where a member which is constantly urged in one direction must be latched against movement in that direction.

The principal object of this invention is to provide a latch assembly for use where one of two members to be latched is constantly urged in one direction, the latch mechanism being such that both latching and unlatching are effected by pulling on a flexible member attached to one part of the latch so as to overcome the constant force which urges the member on which that part of the latch is mounted to move in one direction.

One use for the latch of this invention is in milking parlor stalls. A milking parlor is ordinarily arranged with the stall, or stalls adjacent an alley through which the cattle enter the milking parlor from the barn or feed yard, and each stall has an entrance gate and an exit gate through which the cattle enter and leave the stall. The person handling the milking is in a runway on the opposite side of the parlor stall from the alley through which the cattle enter, and it is necessary for him to open the stall gates individually from the runway. Thus, the stall gates should preferably be hinged to swing outwardly without any direct physical contact by the person handling the milking, and the gate latch should be of a type which may be both engaged and disengaged in a simple remote control movement, as by a rod or chain extending entirely across the top of the stall.

The principal object of the invention is to provide a stall gate assembly which is rugged and inexpensive and in which the opening, closing, latching and unlatching of the gates may be readily and positively controlled from the runway on the opposite side of the stall.

A further object of the invention is to provide latch mechanism for a gate which is constantly urged in one direction in which the gate may be pulled to its closed position by means of a chain or other non-rigid element which also manipulates the latch. Prior art devices of which applicant is aware have had a pipe or rod extending across the stall, and these are invariably bent and damaged when cows rear in the stall.

Still another object is to provide a gate which may be bumped by a cow in the alley without any possibility of unlatching the gate, but which may be readily opened by a person on the alley side of the stall by pushing a portion of the latch with the hand.

The invention is illustrated in a preferred embodiment in the accompanying drawings, in which—

Fig. 1 is a front elevational view of a parlor stall provided with the gate assembly of this invention; Fig. 2 is a plan view thereof; Fig. 3 is a plan view partly in section of the latch assembly; and Fig. 4 is a side elevational view of the latch assembly in closed position partly in section and with parts broken away.

A parlor stall indicated generally at 10, includes a plurality of rails 11 which are supported on gate arches 12 and on a post 13 at the front of the stall. A curb 14 adjoins the front of the stall and is provided with an opening 15 through which a milking machine may be inserted and removed. The post 13 need not be in the position shown in the drawing; but may be conveniently located anywhere along the front of the stall.

Each gate arch 12 is high enough for a cow to pass beneath the top bar 16 of the arch, and the adjacent upright legs 17 of the arches are secured together by means of an upper connecting member 18 and a lower connecting member 19. As best seen in Fig. 1, the gate arches 12 have their adjacent upright legs 17 close together, and extend outwardly and rearwardly in a flat V arrangement when viewed in plan as is Fig. 3.

A stall gate, indicated generally at 20, having an outer frame 20a and cross bars 20b is supported in each arch 12 for outward swinging movement on an upper sleeve type hinge 21 above the connector 18 and a lower sleeve type hinge 22 below the connector 19. Since the stall gates are identical, only one will be described in detail. A chain 23 having a spring section 24 is fastened at one end to a gate cross bar 20b and at the other end to the upper connector 18, and due to the flat V arrangement of the gate arches 12 it stretches across upright post 17 and the upright portion of the gate frame 20a. Thus, when the gate 20 is unlatched the chain 23 and spring 24 tend to draw it to its open position, and once the swing toward open position is started the inertia of the opening gate carries it to a full open position. The sleeve hinges 21 and 22 slide on the stall frame upright 17 upon which they are mounted so that the weight of the gate serves to assist in the opening action. The vertical sliding movement of the gate 20 on the supporting post 17 lengthens the bearing surface and reduces wear. As the gate 20 is closed, and before it reaches its closed position, the sleeve hinge 22 abuts against the lower connector 19 to prevent further lifting of the gate by the chain, thus causing stretching of the spring 24 so as to provide the necessary initial force to open the gate quickly upon unlatching. The gate will open even without a spring, but is slow; and the spring also makes it possible to have the lower sleeve hinge 22 abut against the lower connector 19 as the gate is closed, thereby assuring vertical alignment between the latch elements on the gate and those on the gate arch.

On top of the gate 20 and the top bar 16 of the stall arch is a latch assembly, indicated generally at 25, there being a movable latch portion 26 on the gate 20 and a fixed latch strike assembly 27 on the top bar 16 of the stall arch. A pull plate 28 is secured to the top of the gate 20 by bolts 29 and nuts 30, and has a key shaped aperture 31 to receive a latch bolt 32. The use of a key shaped aperture 31 permits the latch bolt 32 to be inserted in the pull plate after it has been assembled. The latch bolt 32 has a large head 33 which is positioned behind the pull plate 28 and is provided with a resilient cushion 34 backed by a washer 35 which abuts against the outer surface of the pull plate 28. At the rear of the latch bolt 32 is an upright latch lug 36; and attached to the rear of the latch bolt 32 by means of a clevis 37 is a chain 38 which extends through the top of the latch strike assembly 27 on the stall arch and is guided therein by a pair of rollers 39. The chain 38 extends entirely across the stall and through a guide eye 40 in a guide plate 41 which is mounted on top of the post 13. The chain 38 has a free hanging portion 38a with a handle 38b by which it may be pulled to draw the gate shut and to manipulate the latch.

The latch strike assembly 27 includes a lower plate 42 and an upper plate 43 which are separated by tubular spacers 44 through which pass bolts 45 which extend through apertures in the top bar 16 of the gate arch and receive nuts 46 so as to secure the latch strike assembly to said top bar. The lower plate 42 and upper plate 43 are provided with complementary latch strikes 47 and 48, respectively, each of which has a pair of spaced fingers 49 and 50 separated by a notch 51, and a cam surface 52. As the gate is drawn shut by pulling on the chain 38, the latch lug 36 strikes the cam surfaces 52 and is directed out of alignment with the guide rollers 39. When the lug 36 reaches the latch notch 51 it drops into said notch to hold the gate in its latched position. The latch bolt 32 is slidably mounted in the aperture 31 of the pull plate 28 so that the gate may be pushed from the outside without tending to disengage the latch bolt from the latch strikes. It is also freely pivotable by rocking the face of the cushion 34 and washer 35 against the face of the pull plate 28.

As the rear end of the latch bolt snaps sideways to engage the lug 36 in the notch 51 it places a momentary slack in the chain 38, so that the engagement of the latch is obvious to the individual closing the gate, and the latch bolt will not accidentally be pulled past the latch notch 51. When it is desired to open the gate the chain 38 is pulled again to draw the lug 36 out of the notch 51 and around the finger 50 where it is free to pass along the outer surface 53 of the finger 50 and free the gate to swing to open position.

Since the chain 38 is guided between the rollers 39 it may assume any angle across the stall to the guide 40, so that moving the post 13 to any desired position at the front of the milking stall has no effect upon the latch and gate operation.

Due to the fact that the latch bolt 32 rests loosely in the aperture 31 in the pull plate, the gate cannot be unlatched merely by bumping the gate from the alley side; so that there is no danger of the gate being accidentally unlatched by a cow in the alley shouldering it. However, when a person is cleaning the alley and milking parlor stall he may readily unlatch the gate by pushing upon the large head 33 of the latch bolt. The resilient cushion 34 permits the bolt to move rearwardly a short distance even without moving the gate, and of course the gate can also swing rearwardly when the head of the latch bolt is pushed.

The operation of the gate and latch assembly is believed to be plain from the following description. Starting with the gate shut, and the latch parts in the relative positions shown in Figs. 3 and 4, the operator standing at the front of the stall adjacent the curb 14 grasps the handle 38b of the chain 38 which controls the gate which he desires to open, and pulls downwardly on the handle. This force is transmitted through the horizontal part of the chain 38 and acts to draw the latch bolt 32 and the gate 20 forward (toward the operator). The lug 36 moves out of the notches 51 of the latch strikes 47 and 48, along the faces of the fingers 50. When the lug 36 clears the extremities of the fingers 50 the tension of the chain 38 swings the free end of the latch bolt 32 back into alignment with the space between the guide rollers 39, thus positioning the lug 36 against the outer surface 53 of the finger 50. The movement of the lug 36 around the end of the fingers 50 is plainly discernible by the operator, who may then release his grasp upon the handle 38b, permitting the spring 24 to swing the gate toward open position on the hinges 21 and 22. As the gate begins its movement toward open position, the lug 36 slides along the faces 53, and down the flat outer surfaces of the latch strikes 47 and 48. When the gate is in its open position the movable latch portion 26 which is mounted on the gate is swung clear of the latch strike assembly; and as the gate swings open the chain 38 runs through the guides 40 and 39, so that in the full open position of the gate the handle 38b is quite close to the guide plate 41.

To close the gate, the operator need merely grasp the handle 38b and pull downwardly on it until he feels the momentary slack as the lug 36 passes around the ends of the latch strike fingers 49 and into the notches 51. At this point he knows the gate is latched and he stops the pull upon the handle 38b.

While the latch mechanism, and the combination of the latch mechanism with the gate opening arrangement, are particularly useful in a milking parlor stall, it is obvious that the construction might equally well be used on gates for other purposes.

The foregoing detailed description is given for clearness of understanding only and no unnecessary limitations are to be understood therefrom, as modifications will be obvious to those skilled in the art.

I claim:

1. In a gate assembly including a gate arch and a gate hinged on an upright portion of said arch for swinging movement between a forward closed position and an open position, together with means operable when said gate is closed to urge it toward open position, gate latch means comprising a member on the gate and a member on the arch which are provided with releasably interlocking portions, one of said portions being movable generally across the line of movement of the gate to permit the latch to be both latched and unlatched by forward movement of the member on the gate; and flexible means extending through said member on the arch and secured to said member on the gate for drawing the gate forward.

2. The device of claim 1 in which the latch member on the gate is a headed bolt which is loosely supported in an aperture for rocking movement about its head so that the free end of the bolt may move across the line of movement of the gate.

3. The device of claim 2 in which the latch member on the gate arch includes a latch strike having a pair of spaced transversely extending fingers flanking a latch notch, the latch member on the gate has a lug at its free end to slide along one of said fingers to move into the latch notch and on the other of said fingers to move out of said notch, and the flexible means passes through guides directly alined with said notch.

4. The device of claim 3 in which a thick resilient pad is beneath the head of the latch member on the gate.

5. In a gate assembly including a gate arch and a gate hinged on an upright portion of said arch, together with means urging said gate toward open position, gate latch means comprising: a pull plate on the gate which has an aperture; a headed latch bolt extending through said aperture and having a lug at its free end, said bolt being loosely mounted so as to be both slidable and rockable in the pull plate; a latch strike assembly on the gate arch in alignment with the pull plate; a latch strike in said assembly, said latch strike having a pair of transversely extending fingers flanking a latch notch; guide means directly behind said notch; and flexible means secured to the free end of the latch bolt and extending through said guide means.

6. The device of claim 5 in which the aperture in the pull plate is keyhole shaped, and the larger part of the aperture permits passage of the lug on the latch bolt.

7. The device of claim 5 in which a thick resilient pad is positioned beneath the head on the latch bolt.

8. Latch means for a device in which one of two members to be latched is constantly urged in one direction comprising: a latch strike assembly including means providing a transversely open notch; a latch member which is movable longitudinally in and out of said latch strike assembly and has a portion which is adapted to move transversely of the line of motion of the latch member to engage said notch upon movement of the latch member in one direction and thereby prevent reverse movement of the latch member, said latch member being movable further in said one direction to release said portion from said notch and thus permit reverse movement of the latch member, said latch member being constantly urged toward reverse movement; and a flexible latch operating member attached to said latch member for moving said latch member in said one direction.

9. The latch means of claim 8 in which the transversely open notch is provided by a pair of spaced, transversely extending fingers in said latch strike assembly.

10. The latch means of claim 9 in which the latch strike assembly is provided with guide means for the flexible member which is directly aligned with said notch.

11. The latch means of claim 10 in which the transversely extending finger nearer the guide means is longer than the other finger.

12. Latch means comprising: a latch strike assembly having a pair of plates which are rigidly secured together in spaced relationship to provide a housing; a finger assembly between said plates having a pair of spaced transversely extending fingers defining a transversely open notch; a pair of spaced guide members defining a guide channel which is longitudinally aligned with said notch; a latch member which is longitudinally movable with respect to said latch strike assembly, said latch member having a portion which is transversely movable and is provided with a lug to engage said notch; and flexible means attached to said latch member and extending through said guide channel to move said latch member longitudinally with respect to said latch strike assembly.

13. The latch means of claim 12 in which the finger nearer the spaced guide members is longer than the other finger.

ROBERT G. FERRIS.

References Cited in the file of this patent

UNITED STATES PATENTS

| Number | Name | Date |
|--------|------|------|
| 785,550 | Hess et al. | Mar. 21, 1905 |
| 987,574 | Heggen et al. | Mar. 21, 1911 |
| 1,404,238 | Ryan | Jan. 24, 1922 |
| 1,542,151 | Lehtonen | June 16, 1925 |